United States Patent
Calvanese Strinati et al.

(10) Patent No.: US 10,013,282 B2
(45) Date of Patent: Jul. 3, 2018

(54) METHOD AND COMPUTER PROGRAM FOR OFFLOADING EXECUTION OF COMPUTING TASKS OF A WIRELESS EQUIPMENT

(71) Applicants: COMMISSARIAT A L'ENERGIE ATOMIQUE ET AUX ENERGIES ALTERNATIVES, Paris (FR); UNIVERSITA DEGLI STUDI DI ROMA "LA SAPIENZA", Rome (IT)

(72) Inventors: Emilio Calvanese Strinati, Grenoble (FR); Sergio Barbarossa, Rome (IT); Jessica Oueis, Grenoble (FR)

(73) Assignees: Commissariat a l'energie atomique et aux energies alternatives, Paris (FR); UNIVERSITA DEGLI STUDI DI ROMA "LA SAPIENZA", Rome (IT)

( * ) Notice: Subject to any disclaimer, the term of this patent is extended or adjusted under 35 U.S.C. 154(b) by 113 days.

(21) Appl. No.: 15/034,770

(22) PCT Filed: Nov. 3, 2014

(86) PCT No.: PCT/EP2014/073548
§ 371 (c)(1),
(2) Date: May 5, 2016

(87) PCT Pub. No.: WO2015/067554
PCT Pub. Date: May 14, 2015

(65) Prior Publication Data
US 2016/0274938 A1   Sep. 22, 2016

(30) Foreign Application Priority Data

Nov. 5, 2013 (FR) ..................... 13 60817

(51) Int. Cl.
G06F 9/46 (2006.01)
G06F 9/48 (2006.01)
H04L 29/08 (2006.01)

(52) U.S. Cl.
CPC .......... *G06F 9/4881* (2013.01); *G06F 9/4843* (2013.01); *H04L 67/10* (2013.01); *Y02D 10/24* (2018.01)

(58) Field of Classification Search
None
See application file for complete search history.

(56) References Cited

U.S. PATENT DOCUMENTS 5,218,646 A   6/1993   Sirat et al.
6,182,058 B1  1/2001   Kohavi
(Continued)

FOREIGN PATENT DOCUMENTS

EP   0 446 084 A1   9/1991
FR   2 883 396 A1   9/2006

OTHER PUBLICATIONS

International Search Report dated Dec. 5. 2014 in PCT/EP2014/073548 Filed Nov. 3, 2014.
(Continued)

*Primary Examiner* — Gregory A Kessler
(74) *Attorney, Agent, or Firm* — Oblon, McClelland, Maier & Neustadt, L.L.P.

(57) ABSTRACT

A method of processing a computing task required by wireless equipment of a cellular communication network, including classifying the task in at least one class of immediate offloaded execution and a class of immediate local execution, by traversing oriented graph decision nodes and terminal nodes each assigned to one of the classes, the decision nodes being distributed into at least three hierarchical levels themselves distributed into at least three subsets of levels. Traversal of the graph includes: during transit through any decision node of a first subset of levels, veri-
(Continued)

fication of a feasibility criterion for the offloading of the task for execution by third-party equipment; during transit through any decision node of a second subset of levels, verification of a criticality criterion for execution of the task, and during transit through any decision node of a third subset of levels, verification of an opportunity criterion for execution of the task.

13 Claims, 3 Drawing Sheets

(56) References Cited

U.S. PATENT DOCUMENTS

| | | |
|---|---|---|
| 2006/0224359 A1 | 10/2006 | Ashcraft et al. |
| 2008/0147583 A1 | 6/2008 | Ashcraft et al. |
| 2008/0147589 A1 | 6/2008 | Ashcraft et al. |
| 2014/0095695 A1* | 4/2014 | Wang .................. G06F 9/5088 709/224 |

OTHER PUBLICATIONS

French Search Report dated Aug. 20, 2014 in FR 13 60817 Filed Nov. 5, 2013.

Karthik, et al., "A Survey of Computation Offloading for Mobile Systems," Springer Science+ Business Media, LLC, 2012 (12 pages).

Kovachev, et al., "Adaptive Computer Offloading from Mobile Devices in to the Cloud," $10^{th}$ IEEE International Symposium on Parallel and Distributed Processing with Applications, 2012 (8 pages).

* cited by examiner

METHOD AND COMPUTER PROGRAM FOR OFFLOADING EXECUTION OF COMPUTING TASKS OF A WIRELESS EQUIPMENT

TECHNICAL FIELD

The field of the invention is that of cellular radio communication systems. The invention more particularly concerns a distributed processing method for computing tasks according to which the execution of certain tasks is offloaded from a wireless equipment to a remote, third-party equipment.

PRIOR ART

Wireless equipments, for example mobile user equipments or wireless sensors, are increasingly capable of executing complex software applications that require significant computer processing capacities, resulting in particular in needs for memory and power resources.

However, these resources are limited and offloading the execution of certain computing tasks from the wireless equipment to a remote third-party equipment of the cellular radio communication system offers the possibility of expanding the capacities of the wireless equipment as well as its battery life. With regard to mobile user equipment, one may refer to the study by K. Karthik et al. entitled "A Survey of Computation Offloading for Mobile Systems", Mobile Networks and Applications, vol. 18, No. 1, 2013.

With the emergence of advanced mobile user equipment such as "smartphones" and the arrival of new applications consuming data traffic, cellular telecommunication network operators must overcome an exponential increase in data traffic. The consequence of this is increasing congestion in the cells of the access network, and therefore degradation to the quality of service offered to network users. One development of these networks aiming at overcoming this congestion problem involves adding local, low-power access points offering limited radio coverage, generally dedicated to residential or business use. Therefore, the addition, beside the conventional base stations covering a macrocell, the radius of which generally extends from 2 km to 35 km, of local, low-power access points covering a small cell, such as a microcell (radius of less than 2 km), a picocell (the range of which is less than 200 m), or a femtocell (range of about 10 m) is used to satisfy this increase in traffic.

Although such local access points bring radio resources close to users, they also bring close to users resources comprising memory and processing capacities which can be used to offload a part of the computing tasks that must be executed by the mobile user equipment. Similarly, a wireless sensor data collection gateway has resources that can be used by the sensors.

Such offloading requires a decision to be made, generally based on the consideration of a single parameter, i.e. a compromise between the power consumed to perform the offload execution of a task and the power saved by the wireless equipment by having offloaded this execution.

However, many other parameters and conditions can be considered to consolidate the decision and adapt it to suit the conditions of the system in question. For example, limitations affecting wireless equipments other than power consumption can be considered, such as computer processing capacities or the memory resource. Moreover, the offloading decision greatly depends on the task in question, for example on its latency constraints, the complexity of its computer processing, or its memory needs, etc. It is understood that the consideration of a single parameter, such as the compromise involving power consumption, does not allow for a holistic decision to be made, in particular to meet the quality of experience (QoE) expected by the users.

Other works have therefore concentrated on drawing up multi-criteria decision algorithms in order to optimise decision-making. These algorithms however require the resolution of relatively complex optimisation problems. One example of this can be found in the article by Kovachev, D. et al. entitled "Adaptive Computation Offloading from Mobile Devices into the Cloud", 2012 $10^{th}$ IEEE International Symposium on Parallel and Distributed Processing with Applications (ISPA), pp. 784, 791, 10-13 Jul. 2012, which proposes a decision algorithm taking into consideration power, memory and execution time.

DESCRIPTION OF THE INVENTION

There is therefore a need for a decision-making process for the offloading of the execution of a computing task from a wireless equipment to a remote third-party equipment that can take into consideration multiple parameters, without including them in a complex optimisation problem.

The purpose of the invention is to meet this need and in this respect offer a method for processing a computing task, the execution of which is required by a wireless equipment of a cellular communication network, characterised in that it comprises:

a step of classifying the task in a class belonging to a group of classes formed from at least one class of immediate offloaded execution and one class of immediate local execution, if the task belongs to the class of immediate offloaded execution, a step of transmitting an offload execution request for the execution of the task by a third-party equipment of the cellular communication network, and if the task belongs to the class of immediate local execution, a step for the prioritised execution of the task by the wireless equipment, the classifying step being performed by traversing an oriented graph consisting of decision nodes, each having successor nodes in the graph and terminal nodes, each assigned to one of the classes of said group, the decision nodes being distributed into at least three hierarchical levels, themselves distributed into at least three subsets of levels, the traversal of the graph taking place from an initial decision node to reach a terminal node, and comprising:

during the transit through a decision node of a first subset of levels, the verification of a feasibility criterion for the off-loading of the task for execution by a third-party equipment, during the transit through a decision node of a second subset of levels, the verification of a criticality criterion for the execution of the task, and during the transit through a decision node of a third subset of levels, the verification of an opportunity criterion for the execution of the task.

Some preferred, however non-limiting aspects of the method are as follows:

it includes the receipt by the mobile user equipment of an authorisation message authorising the offloaded execution of the task;

the group of classes is formed from at least one class of immediate offloaded execution, one class of deferred offloaded execution, one class of immediate local execution and one class of deferred local execution;

the verification of a feasibility criterion for the offloading of the task for execution by a third-party equipment comprises a measurement of the connectivity status of the wireless equipment with the cellular communication network;

the verification of a criticality criterion for the execution of the task comprises the determination of the latency of the task;

it comprises the verification of a criticality criterion for the execution of the task by the wireless equipment;

it comprises the verification of an opportunity criterion for the offloading of the task for execution by a third-party equipment;

it comprises the verification of an opportunity criterion for the execution of the task by the wireless equipment;

the wireless equipment is a mobile user equipment and the third-party equipment is a local access point to the cellular communication network covering a microcell, a picocell or a femtocell, or a relay to said local access point.

The invention further relates to a computer program product comprising code instructions for executing the classifying step of the method described hereinabove, when said program is executed on a computer.

BRIEF DESCRIPTION OF THE FIGURES

Other aspects, purposes, advantages and characteristics of the invention shall be better understood upon reading the following detailed description given of the non-limiting preferred embodiments of the invention, provided for illustration purposes, with reference to the appended figures, in which.

DETAILED DESCRIPTION OF THE SPECIFIC EMBODIMENTS

Figure 1:
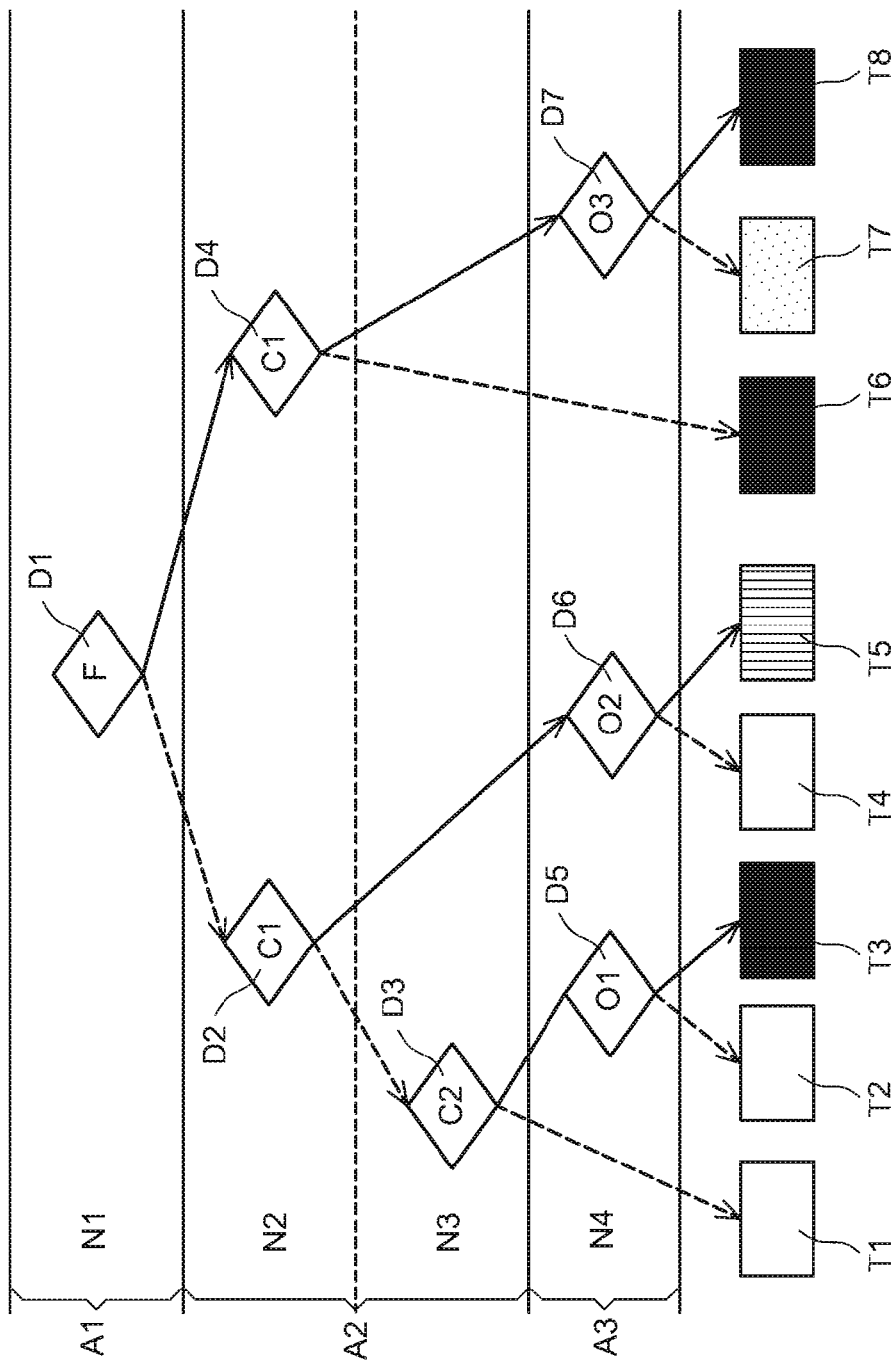
FIG. 1 is a drawing illustrating an oriented graph capable of being used in one possible embodiment of the method according to the invention.

The invention relates to a method for processing a computing task, the execution of which is required by a wireless equipment of a cellular communication network. It further relates to a computer program product comprising code instructions for executing the steps of the method when said program is executed on a computer.

The invention proposes a decision-making process regarding the offloading of a computing task in view of its execution, not by the wireless equipment itself, but by a remote third-party equipment such as a local access point to the cellular communication network (micro-, pico- or femtocell base station), a relay to such a local access point, or even a gateway, for example a wireless sensor data collection gateway. This process uses a hierarchical classification system that takes into consideration multiple parameters for example power consumption, latency constraints, memory needs, computer processing capacities or communication conditions), without increasing the complexity of the decision-making process. The parameters taken into consideration can also be modified according to the target applications, in particular dynamically according to the system's evolutions.

The hierarchical classification includes a series of successive classifying operations, each operation being based on the consideration of a parameter affecting the decision of whether or not to offload.

At each time slot being considered, the method according to the invention is implemented for each of the computing tasks generated by the software application(s) being executed on the wireless equipment.

For each of these tasks, the method according to the invention comprises a step of classifying the task in a class belonging to a group of classes formed from at least one class of immediate offload execution and one class of immediate local execution. Each class is therefore associated with a specific decision with regard to the processing of the task.

This classifying step is then followed, if the task belongs to the class of immediate offloaded execution, by a step of transmitting an offloaded execution request for the execution of the task by a third-party equipment of the cellular communication network. Where relevant, the wireless equipment is then informed of the acceptance of this request via the receipt of an authorisation message authorising the offloaded execution of the task.

The classifying step is further followed, if the task belongs to the class of immediate local execution, by a step for the prioritised execution of the task by the wireless equipment.

In one possible embodiment, said group of classes is formed from at least four classes: one class of immediate offloaded execution, one class of deferred offloaded execution, one class of immediate local execution and one class of deferred local execution. It can also comprise a deferred decision class. If the execution (local or offloaded) or the decision is deferred, a classification of the task can be repeated during the next time slot or during a later time slot.

The classifying step is more particularly performed by traversing an oriented graph, one example embodiment of which is illustrated in FIG. 1. The oriented graph consists of decision nodes D1-D7, each having successor nodes in the graph, and of terminal nodes T1-T8, each assigned to one of the classes of said group.

The decision nodes can in particular be binary decision nodes, each having two successor nodes in the graph. The remainder of the description hereinbelow will therefore refer to such binary decision nodes, made with reference to the example embodiment illustrated in FIG. 1, without being limited thereto, whereby a decision node of the oriented graph is capable of comprising more than two successor nodes according to the criterion verified during the transit through said node.

The binary decision nodes D1-D7 are distributed into at least three hierarchical levels N1-N4, these levels themselves being distributed into at least three subsets of levels A1-A3, each comprising at least one level. The levels of a subset of levels can be hierarchically consecutive levels of the graph, without being limited thereto.

With reference to the example in FIG. 1, the first subset of levels A1 comprises a single level N1 where the binary decision node D1 is located, acting as a vertex or initial decision node of the oriented graph. The second subset of levels A1 comprises two levels N2 and N3 where the binary decision nodes D2, D4 and D3 are respectively located. The third subset of levels A3 comprises a single level N4 where the decision nodes D5-D7 are located.

The traversal of the graph takes place from an initial binary decision node (node D1 in the example in FIG. 1) to reach a terminal node T1-T8. This traversal comprises:

during the transit through a binary decision node D1 of a first subset of levels A1, the verification of a feasibility criterion for the offloading of the task for execution by the third-party equipment, during the transit through a binary decision node C1, C2 of a second subset of levels A2, the verification of a criticality criterion for the execution of the task, and during the transit through a binary decision node O1, O2, O3 of a third subset of levels A3, the verification of an opportunity criterion for the execution of the task.

In one possible embodiment, such as that illustrated in FIG. 1, the first, second and third subsets of levels A1-A3 are therefore hierarchically arranged in the graph. This takes place such that the feasibility criterion or criteria is are studied before the criticality criterion or criteria, itself/themselves being studied before the opportunity criterion or criteria. The invention is not however limited to this scenario, and the terms "first", "second" and "third" subsets must be understood as describing a specific subset, and not as a hierarchical order in the graph. Therefore, for the purposes of illustration, the first subset can indeed be traversed after the third subset, itself traversed after the second subset. It is recalled that the levels of a subset of levels are not necessarily consecutive in the graph.

The invention is also not limited to the three subsets of levels described hereinabove and covering the feasibility, criticality and opportunity decision criteria families. On the contrary, it extends to a larger number of subsets so as to enable other decision criteria families to be incorporated, for example a subset of levels for verifying a security criterion for the execution of the task, or even for verifying a criterion regarding the non-invasion of privacy (for example if personal data could be transmitted to a third party in the event of offloaded execution), etc.

The following description aims to provide, with reference to the purely illustrative example in FIG. 1, examples of decision criteria that can be associated with a decision node, the satisfaction or non-satisfaction of which is verified during the traversal of the group to classify a task into one of the classes.

In this example, a feasibility criterion F for the offloading of the task for execution by the third-party equipment is therefore associated with an initial binary decision node D1. The transit through this node D1 results in a step for determining the satisfaction or non-satisfaction of this criterion, and therefore in the production of a distinction between tasks that can be offloaded and tasks that cannot be offloaded.

The feasibility criterion F is, for example, a technical criterion such as a hardware configuration parameter required to execute the task. The verification of this criterion consists, for example, in querying a look-up table where the offloading capability of a task is recorded (such a table can be built via a learning process, for example by recording the result of a task offloading test), or in directly querying the task when the offloading capability is provided during its programming.

The feasibility criterion F can also take into consideration the quality of a communication channel linking the wireless equipment and the remote third-party equipment. The verification of the satisfaction of this criterion can therefore further include a measurement of the connectivity status of the wireless equipment with the cellular communication network, said criterion not being satisfied when the status measured is less than a threshold. For example, in the event of no connectivity, the feasibility criterion F is not met.

If the feasibility criterion or criteria is/are met, and still with reference to the example in FIG. 1, the traversal of the graph continues via the transit through the binary decision node D2 with which is associated a first criticality criterion for the execution of the task C1, in this case provided to produce a distinction between urgent and non-urgent tasks.

This first criterion C1 is, for example, met when the latency associated with the task is less than a given threshold, which depends, for example, on the quality of experience QoE expected by a user. This first criterion C1 can therefore use the time to live (TTL) of the task, which can be entered into a look-up table, the criterion being met when the time to live of the task is less than a threshold, for example a percentage of a maximum time to live that is acceptable to the user.

If this first criticality criterion C1 is met, the traversal of the graph in FIG. 1 continues via the transit through the binary decision node D3 with which is associated a second criticality criterion for the execution of the task C2. This second criterion C2 is more particularly a criticality criterion for the execution of the task by the wireless equipment.

This second criterion C2 is applied to the urgent tasks capable of being offloaded, however which local execution by the wireless equipment is not ruled out. However, the local execution of these tasks may be impossible because of a lack of the resources required in the wireless equipment. In this case, these tasks must be offloaded. The determination of the satisfaction or non-satisfaction of this second criterion C2 can take on the form of a series of tests taking into consideration the processing capacities, the memory needs and the battery consumption. For the purposes of illustration, this criterion C2 is satisfied if one of the following conditions is met:

the battery power level is less than a pre-set critical threshold;

the task consumes more than a given percentage of remaining power;

the memory needs for the task are greater than an authorised percentage of available memory of the wireless equipment;

the task requires processing capacities that are greater than a percentage of the processing capacities of the wireless equipment.

If this second criticality criterion C2 is met, the local execution of the task is considered to be critical, and the traversal of the graph leads to the terminal node T1, in this case associated with the class of immediate offloaded execution.

If this second criticality criterion C2 is not met, the local execution of the task is not considered to be critical, and the urgent task capable of being offloaded can therefore either be offloaded or executed locally. The decision in this case is made by the transit through the decision node D5 with which is associated an opportunity criterion O1 for the execution of the task. The opportunity criterion is, for example, an opportunity criterion for the execution of the task by the third-party equipment. This can be a power-related opportunity criterion, and the determination of the satisfaction of this criterion O1 may consist in verifying whether the offloaded execution by the third-party equipment consumes less power than the local execution.

If this criterion O1 is satisfied, the traversal of the graph results in the terminal node T2, in this case associated, as for the terminal node T1, with the class of immediate offloaded execution. Conversely, if this criterion O1 is not satisfied, the traversal of the graph results in the terminal node T3, in this case associated with the class of immediate local execution.

Back to the decision node D2, if the criticality criterion C1 is not met (the task can therefore be offloaded but is not urgent), the traversal of the graph transits through the decision node D6, with which is associated an opportunity criterion O2 for the execution of the task. The purpose of this criterion O2 is, for example, to study the opportunity of offloading the task, even though it is not urgent.

The determination of the satisfaction or non-satisfaction of this opportunity criterion O2 consists, for example, in examining if the capacity of the communication channel allows for the transmission of all tasks classed into the class of immediate offloaded execution (terminal nodes T1 and T2). For example, if the current channel coefficient is greater than the mean coefficient, the channel status is considered to be good. The opportunity criterion O2 is therefore met, the traversal of the graph results in the terminal node T4, in this case associated with the class of immediate offloaded execution. This allows for the offloading of the execution of a maximum number of non-urgent tasks capable of being offloaded, while, for example, prioritising those with the lowest latencies.

Conversely, if the opportunity criterion O2 is not met, the traversal of the graph results in the terminal node T5, in this case associated with the class of deferred offloaded execution.

Such an offloading of non-urgent tasks can be considered to not only be an opportunistic use of the radio link, but also a tool designed to relieve the system during subsequent time slots. Conversely, the system is prevented from performing expensive offloaded processes if the channel conditions are not good.

Back to the decision node D1, if the feasibility criterion F is not met (the task cannot be offloaded), the traversal of the graph transits through the decision node D4, with which is associated the first criticality criterion C1 for the execution of the task already described hereinabove. Therefore, depending on the latency of the task, the latter is classed as urgent or non-urgent.

If the first criticality criterion C1 is satisfied (the task is urgent), the traversal of the graph leads to the terminal node T6, in this case associated with the class of immediate local execution. Conversely, if this criticality criterion C1 is not met (the task is not urgent), the traversal of the graph transits through the decision node D7, with which is associated an opportunity criterion O3 for the non-urgent execution of the task by the mobile user equipment. This opportunity criterion O3 is, for example, similar to the criticality criterion C2 and is used to verify whether the non-urgent execution of the task would be critical for the mobile user equipment.

If not, the resources of the mobile equipment are used opportunistically to perform the immediate local execution of the task, even though said task is not urgent. The traversal of the graph thus results in the terminal node T8, in this case associated with the class of immediate local execution.

If such an opportunistic use is not possible, the traversal of the graph results in the terminal node T7, in this case associated with the class of deferred local execution.

Simulations have been made to estimate the performance levels of the method according to the invention (method A according to the example in FIG. 1, the battery discharge of which is illustrated by the curves with crosses in FIGS. 2-4) in comparison with other task processing methods that must be implemented by a mobile user equipment. For the purposes of comparison, the following methods are considered:

a method wherein no offloading takes place (method B: curves with diamonds), a method inspired by the standard approach wherein the offloading decision is made when the power consumed by the wireless equipment to execute the task is less than the power consumed by the wireless equipment to offload the task to a local access point such as a femtocell (method C: curves with dots), and a method wherein an off-siting process is systematically performed if the task is capable of being offloaded (method D: curves with circles).

Three scenarios have also been considered, combining parameters representing a mean channel coefficient (low $\alpha_{min}$, random $\alpha_{mix}$ or high $\alpha_{max}$) and a computing intensity per task (low $TC_{min}$, random $TC_{mix}$ or high $TC_{max}$). According to scenario No. 1, the channel conditions are good ($\alpha_{max}$) and the tasks require a high computing intensity ($TC_{max}$). According to scenario No. 2, the channel conditions are poor ($\alpha_{min}$) and the tasks require a low computing intensity ($TC_{min}$). According to scenario No. 3, the channel conditions are random ($\alpha_{mix}$) and the tasks require a random computing intensity ($TC_{mix}$).

The simulations have been performed by taking into consideration a single user located 5 meters from the base station of a femtocell. The uplink bandwidth is 20 MHz, the attenuation coefficient along the path is equal to 5, the noise has a power of $10^{-3}$ W, and a channel coherence time of 10 ms. The transmission power is 0.2 W and the simulations were performed on about $2.10^5$ channel instances per hour.

The wireless equipment is characterised by a power consumption per instruction estimated to be between 17 nJ and 19 nJ, a total power capacity of between 4 Wh and 8 Wh, and an available memory of 5 MB.

An application call generates a slave of 10 tasks, each characterised by a memory need between 1 KB and 1 MB, a number of bits to be offloaded between 1 KB and 20 KB and a latency constraint between 90 ms and 300 ms. The application call is modelled according to a Poisson distribution with a rate of 2 over 10 ms.

Figure 2:
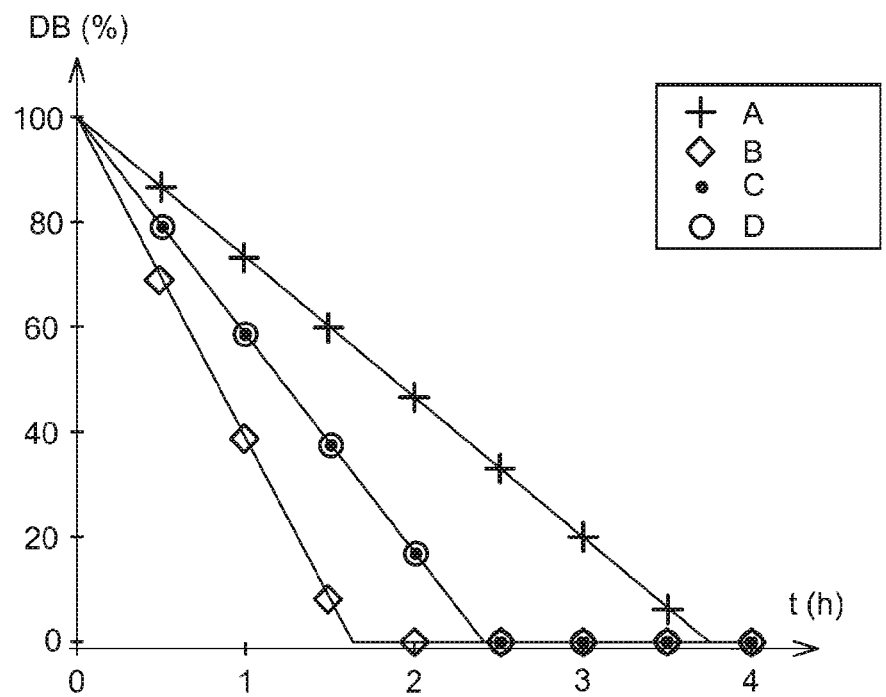
FIGS. 2 to 4 are drawings derived from simulations illustrating the performance levels of the invention in terms of power consumption, compared to other offloading decision-making processes, according to different scenarios.

FIG. 2 illustrates the power discharge of the battery DB during the time t (in hours) for the four methods A-D presented hereinabove, within the scope of scenario No. 1. The offloading is observed to always be beneficial and method A according to the invention is shown to be more efficient than all of the other methods with a battery life extended by a factor of 2.29 compared to method B and by a factor of 1.55 compared to method D.

Figure 3:
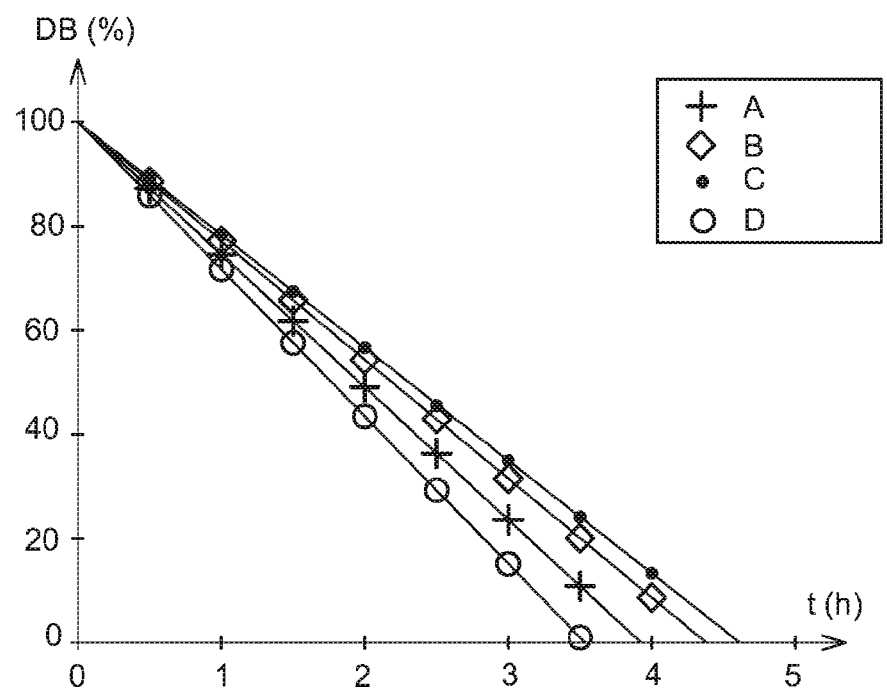

FIG. 3 illustrates the battery discharge over time for the four methods A-D presented hereinabove, within the scope of scenario No. 2. This scenario shows that method A according to the invention is less efficient than method C (offloading only based on the power criterion) and method B (no offloading). This is because method A offloads urgent tasks capable of being offloaded, regardless of the channel conditions. This affects consumption, however guarantees good QoE.

Figure 4:
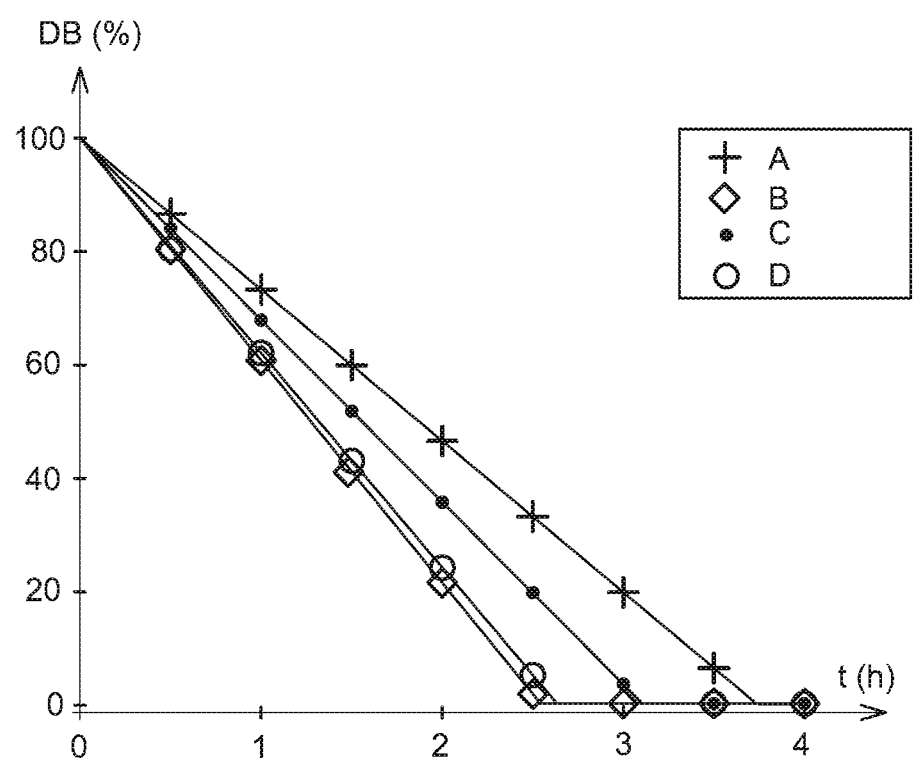

FIG. 4 illustrates the battery discharge over time for the four methods A-D presented hereinabove, within the scope of scenario No. 3. This random scenario shows that method A according to the invention is more efficient than method C (offloading only based on the power criterion), with a battery life extended by a factor of 1.45 compared to method B.

The results of these simulations are recorded in the table below.

| Scenario | Method | Battery life (min) | Memory capacity exceeded (%) | Computing capacity exceeded (%) |
|---|---|---|---|---|
| 1 | A | 223.9 | 0 | 0 |
|   | B | 97.86 | 2.61 | 5.02 |
|   | C | 144.77 | 0.17 | 4.31 |
|   | D | 144.77 | 0.17 | 4.31 |
| 2 | A | 235.64 | 0 | 0 |
|   | B | 263.19 | 0.3 | 0 |
|   | C | 277.8 | 0.02 | 0 |
|   | D | 231.02 | <0.01 | 0 |
| 3 | A | 223.96 | 0 | 0 |
|   | B | 153.09 | 1.29 | 0 |
|   | C | 187.09 | 0 | 0 |
|   | D | 158.87 | 0 | 0 |

Therefore, further to its interest in terms of energy savings, the method according to the invention has the advantage of limiting occurrences during which memory capacity and computing capacity are exceeded.

The invention claimed is:

1. A method of processing computing tasks generated by a software application which is executed by a wireless equipment of a cellular communication network, the method comprising for each of the computing tasks:
   classifying the task in a class belonging to a group of classes formed from at least one class of immediate offloaded execution, one class of deferred offloaded execution, one class of immediate local execution and one class of deferred local execution;
   if the task belongs to the class of immediate offloaded execution, transmitting an offload execution request for the execution of the task by a third-party equipment of the cellular communication network; and
   if the task belongs to the class of immediate local execution, performing prioritized execution of the task by the wireless equipment;
   the classifying being performed by traversing an oriented graph of decision nodes, each having successor nodes in the graph and terminal nodes, each assigned to one of the classes of the group, the decision nodes being distributed into at least three hierarchical levels, themselves distributed into at least three subsets of levels, traversal of the graph taking place from an initial decision node to reach a terminal node, and comprising:
      during transit through a decision node of a first subset of levels, verification of a feasibility criterion for offloading of the task for execution by the third-party equipment item, whereby if the feasibility criterion is verified, execution of the task can be offloaded, while if the feasibility criterion is not verified, execution of the task cannot be offloaded;
      during transit through a decision node of a second subset of levels, verification of a criticality criterion for execution of the task, whereby if the criticality criterion is verified, execution of the task is to be immediate, while if the criticality criterion is not verified, execution of the task can be deferred; and
      during transit through a decision node of a third subset of levels, verification of an opportunity criterion for execution of the task.

2. The method according to claim 1, further comprising, when the offload execution request is accepted by the third-party equipment, receiving, by the wireless equipment, an authorization message authorizing the offloaded execution of the task.

3. The method according to claim 1, wherein the verification of a feasibility criterion for the offloading of the task for execution by the third-party equipment comprises a measurement of the quality of the communication channel between the wireless equipment and the cellular communication network, the feasibility criterion not being verified if the measured quality is less than a threshold.

4. The method according to claim 1, wherein the verification of a criticality criterion for the execution of the task comprises determination of latency of the task, the criticality criterion not being verified if the determined latency is greater than a threshold.

5. The method according to claim 1, further comprising verification of a criticality criterion for the execution of the task by the wireless equipment.

6. The method according to claim 5, wherein the criticality criterion for the execution of the task by the wireless equipment is verified when a power level of a battery of the wireless equipment is less than a threshold, or when execution of the task consumes more than a given percentage of the power level of the battery, or when memory needs for the task are greater than a percentage of available memory of the wireless equipment, or when the task requires processing capacities that exceed a percentage of processing capacities of the wireless equipment.

7. The method according to claim 1, wherein the verification of an opportunity criterion for the offloading of the task comprises verifying the opportunity criterion for the offloading of the task for execution by the third-party equipment.

8. The method according to claim 7, wherein the verification of the opportunity criterion for the offloading of the task for execution by the third-party equipment comprises a comparison between connectivity status of the wireless equipment with the cellular communication network and a mean connectivity status.

9. The method according to claim 7, wherein the verification of the opportunity criterion for the offloading of the task for execution by the third-party equipment item comprises a comparison between quantity of power consumed if the execution of the task is offloaded to the third-party equipment and quantity of power consumed if the execution of the task is performed locally by the wireless equipment.

10. The method according to claim 1, wherein the verification of an opportunity criterion for the execution of the task comprises verifying the opportunity criterion for the execution of the task by the wireless equipment.

11. The method according to claim 10, wherein the opportunity criterion for the execution of the task by the wireless equipment is not verified when a power level of a battery of the wireless equipment is less than a threshold, or when execution of the task consumes more than a given percentage of the power level of the battery, or when memory needs for the task are greater than a percentage of available memory of the wireless equipment, or when the task requires processing capacities that exceed a percentage of processing capacities of the wireless equipment.

12. The method according to claim 1, wherein the wireless equipment is a mobile user equipment item and the third-party equipment is a local access point to the cellular communication network covering a microcell, a picocell or a femtocell, or a relay to the local access point.

13. A non-transitory computer program product comprising computer code instructions for executing the classifying of the method according to claim 1, when the computer code instructions are executed on a computer.

* * * * *